United States Patent [19]

Mayer

[11] Patent Number: 4,483,214
[45] Date of Patent: Nov. 20, 1984

[54] METHOD FOR THE PRODUCTION OF FIBRE REINFORCED ARTICLES

[75] Inventor: Rayner M. Mayer, Yateley, England

[73] Assignee: The British Petroleum Company p.l.c., London, England

[21] Appl. No.: 477,121

[22] Filed: Mar. 21, 1983

[30] Foreign Application Priority Data

Mar. 23, 1982 [GB] United Kingdom ................ 8208413

[51] Int. Cl.³ .......................... B29C 5/00; B29D 3/02; F16F 15/30; H02K 7/02
[52] U.S. Cl. ...................................... 74/572; 156/166; 156/169; 156/172; 156/173; 156/180; 156/245; 156/303.1; 264/103; 264/257; 264/328.3; 301/63 PW
[58] Field of Search ...................... 264/257, 103, 328.3; 74/572; 416/134 R, 218, 230, 229 R, 223 R, 241 A; 301/63 PW, 64 R; 156/166, 169, 172, 173, 180, 303.1, 245

[56] References Cited

U.S. PATENT DOCUMENTS

| | | | |
|---|---|---|---|
| 3,501,090 | 3/1970 | Stoffer et al. | 416/230 |
| 3,602,066 | 8/1971 | Wetherbee | 74/572 |
| 3,632,460 | 1/1972 | Palfreyman et al. | 156/173 |
| 3,672,241 | 6/1972 | Rabenhorst | 416/230 |
| 3,917,352 | 11/1975 | Gageby | 301/63 PW |
| 3,954,379 | 5/1976 | Klocke | 156/180 |
| 4,138,286 | 2/1979 | Chevrolat et al. | 74/572 |
| 4,176,563 | 12/1973 | Younger | 74/572 |
| 4,183,259 | 1/1980 | Giovachini et al. | 74/572 |
| 4,198,878 | 4/1980 | Lewis et al. | 74/572 |
| 4,359,912 | 11/1982 | Small | 74/572 |

*Primary Examiner*—Willard E. Hoag
*Attorney, Agent, or Firm*—Morgan, Finnegan, Pine, Foley & Lee

[57] ABSTRACT

A method for the production by resin injection moulding of fibre reinforced articles from fibrous material bonded in a curable matrix material which articles comprise two or more spokes (2, 3, 4) extending from a hub portion (1), each spoke (2, 3, 4) being in the form of a loop is characterized in that the fibrous material is arranged such that at least as many rovings (13, 14, 15 or 22, 23, 24) of the fibrous material as there are spokes (2, 3, 4) extend in continuous paths from the hub portion (1) around each of the spokes, each of the rovings being overlaid for at least part of its length by each of the other rovings. The method is suitable for the production of intricately shaped articles which are to be highly stressed for example by being subjected to high rotational speeds.

12 Claims, 4 Drawing Figures

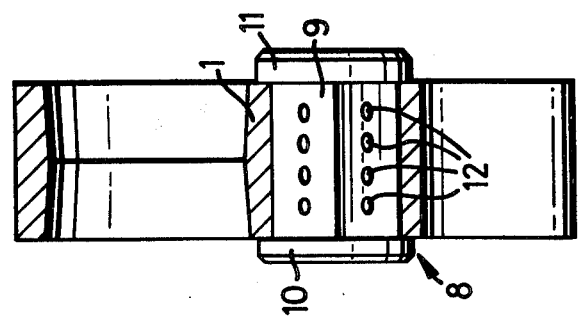
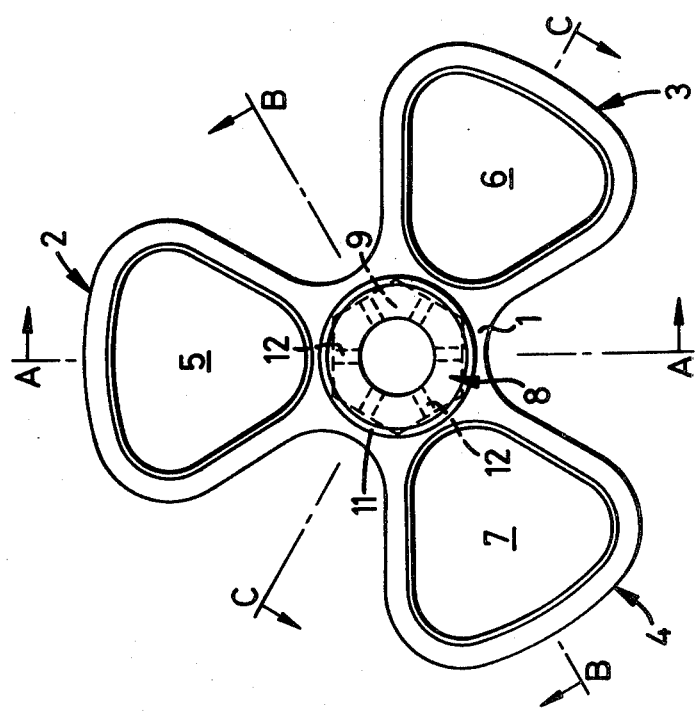

METHOD FOR THE PRODUCTION OF FIBRE REINFORCED ARTICLES

This invention relates to a method for the production of fibre reinforced articles and in particular to fibre reinforced articles having an intricate shape.

Fibre reinforced composite materials are widely used to produce light-weight, high-strength articles. One method of producing articles for fibre reinforced composite materials is the resin injection moulding technique. This method comprises positioning rovings of a fibrous material in a mould in the shape of the article to be produced, closing the mould and filling it with a curable matrix material without substantially disturbing the position of the fibres and then curing the matrix material.

Symmetrical solid articles are often produced by the resin injection moulding technique by simply positioning the fibre rovings in a concentric or helical pattern from the centre to the circumference of the mould. However this arrangement is not suitable if the article is to have an intricate shape and particularly if the article is to have a number of apertures in the fibre reinforced composite material. It is difficult to produce such intricately shaped articles which do not have areas between apertures or other intricately shaped sections which have gaps in the layers of fibres or voids in the matrix material. The laying out of the fibres in a concentric or helical pattern also means that a fault in the article may be propagated around the article between the layers of fibres.

These difficulties are particularly important if the article is to be severely stressed. For example, if the article is to be subjected to very high rotational speeds, the centrifugal forces acting on an article formed from concentrically or helically arranged fibre layers may cause the article to delaminate.

The applicants have invented a method of producing fibre reinforced articles, particularly intricately shaped articles, which overcomes or at least mitigates the problems of the known method.

Thus according to the present invention a method for the production of fibre reinforced articles by resin injection moulding which articles comprise two or more spokes extending from a hub portion, each spoke being in the form of a loop is characterised in that the fibrous material is arranged such that at least as many rovings of the fibrous material as there are spokes extend in continuous paths from the hub portion around each of the spokes, each of the rovings being overlaid for at least part of its length by each of the other rovings.

In addition to the rovings extending from the hub portion around each of the spokes, there may be additional rovings around the spokes and/or around the hub portion.

The materials for producing fibre reinforced articles according to the present invention may, for example, be carbon fibres or glass fibres, such as the type known as E glass, and a curable matrix material such as epoxy resin. Preferably the fibrous materials are in the form of woven tape or sheets of the fibres with the bulk of the fibres lying in a longitudinal direction.

A core section may be bonded into the hub portion during the manufacture of the article. Such a core section may act as a former during manufacture around which the composite material may be moulded. The core section may be plastic, metal e.g. aluminium or fibre reinforced plastic material e.g. glass reinforced plastic.

The method according to the present invention will be described by way of example by considering the production of a spider for a flywheel designed to be rotated at high speed. The invention will be described with reference to the accompanying drawings FIGS. 1 to 4. However, the example and FIGS. should not be taken as limiting the invention.

FIG. 1 is an end elevation of an article produced by the method according to the present invention.

FIG. 2 is a sectional side view of the article of FIG. 1 taken along any one of lines A—A, B—B or C—C.

Figure 3:
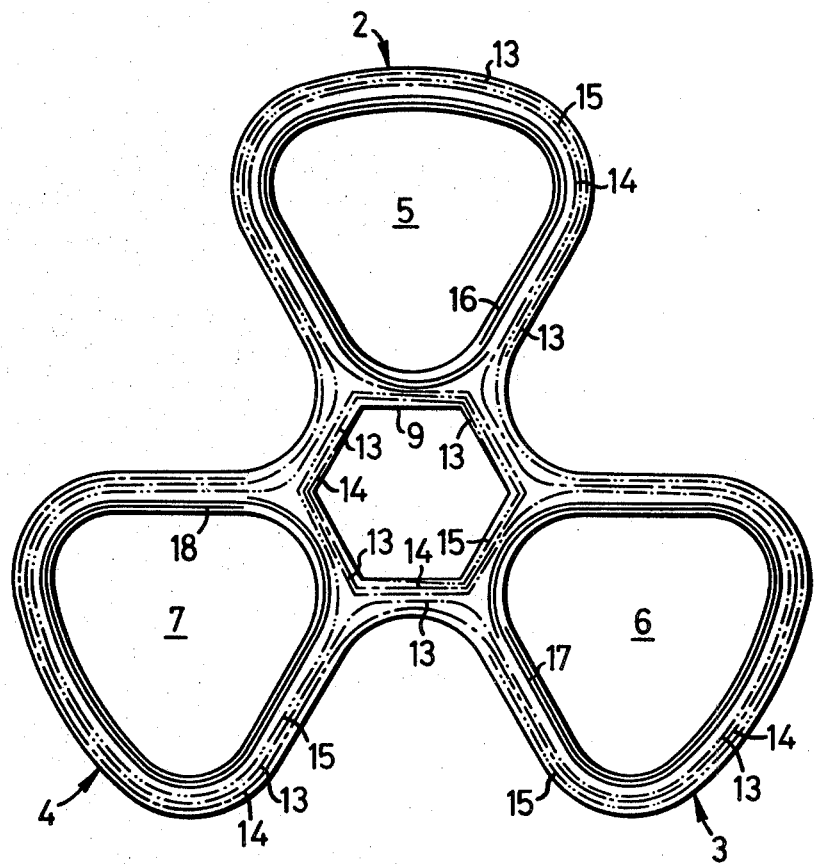
FIG. 3 is an end view of the article of FIGS. 1 and 2 illustrating schematically an arrangement of the fibre rovings.

The article shown in FIGS. 1 and 2 comprises a hub portion 1 from which three spokes 2, 3 and 4 radiate. Each spoke is in the form of a loop i.e. each spoke 2, 3 and 4 has a respective aperture 5, 6 and 7. The article is substantially symmetrical about each of lines A—A, B—B and C—C in FIG. 1 and FIG. 2 is a sectional view along any one of these lines.

The hub portion 1 has a core section, shown generally at 8 in FIGS. 1 and 2, bonded into the centre of the article. The core section 8 comprises a tube section 9 having a flange 10 and 11 at each end. The core section 8 is preferably bonded into the composite material of the hub 1 during the manufacture of the article and forms part of the finished article. Alternatively, a core section may be inserted after the article has been produced. Although a core section may not be required in some articles, it is useful in the example described since the article is a spider for a flywheel and the core section 8 provides means by which the flywheel may be mounted on a shaft (not shown).

If the core section 8 is bonded into the hub portion 1 during manufacture, the core may act as a former around which the composite material is moulded. The core section 8 may also be used to assist the injection of the matrix material into the mould as described later.

As shown in the Figures, the outer surface of the tube section 9 has an angular outer surface e.g. hexagonal so that the tube is keyed into the composite material. Alternative methods of keying the core section 8 to the hub 1 may also be used. The shape and dimensions of the inner surface of the core section are determined by the function of the core in the finished article. The article shown in the Figures is a spider for a flywheel and so the inner surface of the tube section 9 is preferably shaped to receive a shaft (not shown). The core may be metal, preferably a low density metal such as aluminium, or it may be a composite material, such as glass reinforced plastic, or it may be plastic.

The tubular section 9 may have a plurality of holes 12 which may be used to anchor the ends of fibre rovings at the hub, or as described later, they may be used to inject matrix material into the mould during manufacture.

Figure 4:
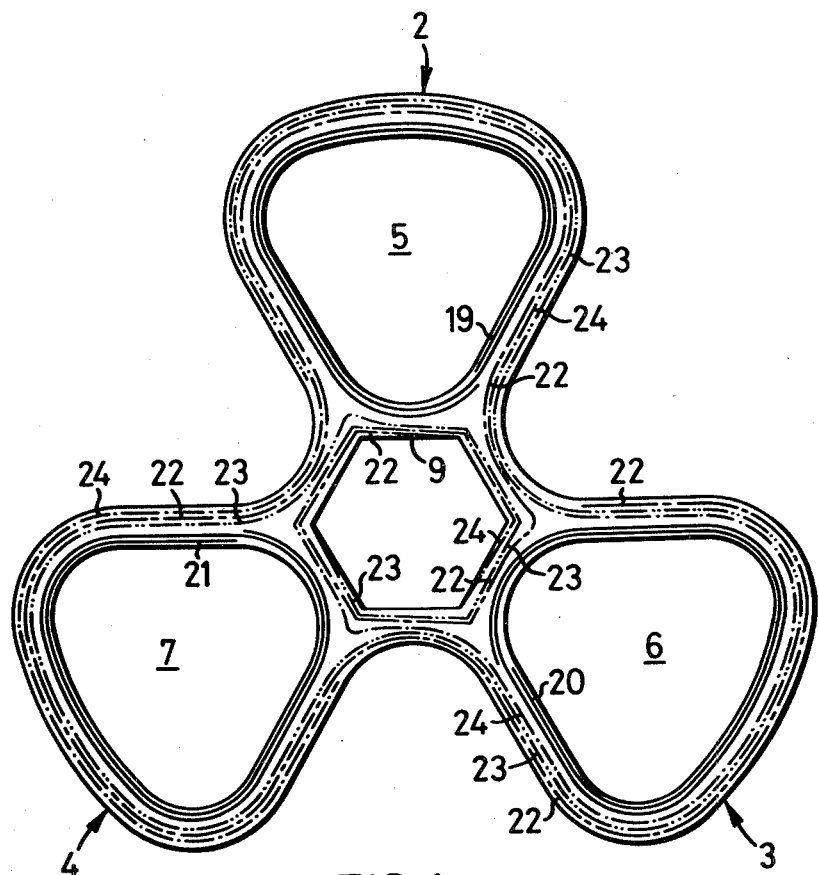
FIG. 4 is an end view of the article of FIGS. 1 and 2 illustrating schematically an alternative arrangement of the fibre rovings.

FIGS. 3 and 4 illustrate two possible arrangements of the fibre rovings for an article having three spokes. The rovings are shown as being spaced apart in order that the winding sequence may be more clearly distinguished. In practice the layers would be tightly wound against each other.

Considering the arrangement of fibre rovings in FIG. 3. The rovings 16, 17 and 18 would preferably be positioned in the mould first. These rovings are additional rovings positioned around the inner surface of the loops of the spokes. In this description of the winding sequence reference will be made to the apertures which means the positions of the apertures in the finished article. In the mould the position of the apertures is occupied by a former around which the fibre rovings are wound to produce the loop shape of the spokes.

As shown in FIG. 3 the fibre material is wound in an anti-clockwise direction around the position of the aperture so that the roving is two layers thick around the position of the aperture.

The three rovings 13, 14 and 15, i.e. as many rovings as spokes, are arranged so that they extend in continuous paths from the hub portion around each spoke, each of the three rovings being overlaid by the other two for at least part of their length. One end of each of the three rovings 13, 14 and 15 is preferably fixed to the core section 8 and the ends of the rovings are preferably fixed at equal distances around the core section 8. A suitable method of fixing the rovings to the core 8 comprises laying the fibrous material over the tube section 9 and placing a staple over the material with the legs of the staple passing into holes 12 in the tube section 9. If a core section 8 is not bonded into the hub portion during manufacture of the article, the ends of the rovings at the hub portion are equally spaced around a former in the mould.

In FIGS. 1 and 3, the outer surface of the tube section 9 is hexagonal in cross section and is arranged so that there is a flat of the hexagon opposite each spoke 2, 3 and 4 and between each pair of spokes. Each of the three rovings 13, 14 and 15 starts at one of the flats of the hexagon which is between a pair of spokes i.e. approximately 120° apart.

Although the rovings 13, 14 and 15 are wound simultaneously, the path of each roving 13, 14 and 15 is similar and so the winding sequence will be described with reference to the roving numbered 13 in FIG. 3.

The start of the roving 13 is on the flat of the hexagonal tube section 9 which is between spokes 2 and 3 and is positioned towards the side of the flat nearest to spoke 3 as shown in FIG. 3.

From the starting position the fibre material 13 is wound in an anti-clockwise direction around the hexagonal outer surface of the tube section 9. Preferably the edges of the hexagonal shape are curved to prevent damage to the fibres. The roving 13 is laid over the tube section 9 until it reaches the flat of the hexagon which is between spokes 2 and 4. The start of the roving 14 is positioned at this flat and so roving 13 is laid over roving 14 until they reach the flat of the hexagon which is between spokes 4 and 3. The start of roving 15 is positioned at this flat. Roving 13 is then wound in a clockwise direction around the position of aperture 6 in spoke 3. Thus the layers of roving 17 around the aperture 6 are encircled by the roving 13. Rovings 14 and 15 overlay the roving 13 around the outside of spoke 3. The roving 13 is then wound in a clockwise direction round the spokes 4 and 2. Around spoke 4 roving 13 is overlaid by roving 14 and around the spoke 2 roving 13 is the outer layer. Roving 13 ends adjacent to the outer surface of the article at a position near the base of spoke 2 and between spokes 2 and 3.

Each of the other two rovings which start at the core have a similar winding sequence. Thus each of the three rovings 13, 14 and 15 forms the outer layer around one spoke, is overlaid by one of the other rovings around a second spoke and is overlaid by both of the other rovings over a third spoke. Also each of the rovings 13, 14 and 15 encircles the additional rovings around one of the positions of the apertures 5, 6 and 7 i.e. roving 13 encircles the roving 17 around aperture 6, roving 14 encircles the roving 16 around the aperture 5 and roving 15 encircles roving 18 around aperture 7.

Considering the alternative arrangement of fibres illustrated in FIG. 4, the fibre rovings 19, 20 and 21 are positioned around the positions of apertures 5, 6 and 7 in the same manner as for rovings 16, 17 and 18 in the winding sequence shown in FIG. 3 i.e. the rovings are wound anti-clockwise around the position of each aperture so that there are two layers of fibre around each aperture.

The three rovings 22, 23 and 24 are arranged so that they extend in continuous paths from the hub portion 1 around the spokes, each roving being overlaid by each of the other two for at least part of their length. One end of each roving is attached to the tube section 9, the attached ends being positioned at equal distances around the tube section 9.

Although the rovings 22, 23 and 24 are wound simultaneously, the path of each roving 22, 23 and 24 is similar and so the winding sequence shown in FIG. 4 will be described with reference to the roving numbered 22.

The start of the roving 22 is on the flat of the hexagonal tube section 9 which is opposite spoke 2. The start of the roving is positioned towards the right side of the flat as shown in FIG. 4. From the starting position the fibre material is wound in an anti-clockwise direction around the hexagonal outer surface of the tube section 9. The roving 22 is laid over the tube section 9 until it reaches the starting point of roving 23 which is at the end of the flat of the hexagon opposite spoke 4. Roving 22 is laid over roving 23 until they reach the start of roving 24 at the end of the flat of the hexagon opposite spoke 3. Rovings 22 and 23 both overlay roving 24 until they reach the base of spoke 2. Roving 22 is then wound anti-clockwise around spoke 2 overlaying the roving 19. Rovings 23 and 24 overlay roving 22 around the outside of spoke 2. The roving 22 is then wound in an anti-clockwise direction around spokes 4 and . Around spoke 4 roving 22 is overlaid by roving 24 and around spoke 3 roving 22 is the outer layer. Roving 22 ends adjacent to the outer surface of the article at a position near the base of spoke 3 between spokes 3 and 2.

Each of the other two rovings 23 and 24 has a similar winding sequence. Thus each of the three rovings 22, 23 and 24 forms the outer layer around one spoke, is overlaid by one of the other rovings around a second spoke and is overlaid by both of the other rovings over a third spoke.

Thus the winding sequences shown in FIGS. 3 and 4 produce an arrangement of overlapping rovings according to the present invention. In the winding sequences shown there are five layers of fibres throughout the article. However, it is to be understood that the particular arrangements shown in the Figures are merely examples and that alternative arrangements are possible and that the same method can be used to arrange fibre rovings to produce articles with a different number of fibre layers and/or a different number of spokes. In particular it should be noted that the terms clockwise and anti-clockwise are used only in relation to the Figures and do not imply a limitation of the invention.

Alternative winding sequences within the present invention include arrangements in which, 1. additional rovings are included at the hub portion,
2. the additional rovings at the apertures of the spokes (16, 17 and 18 of FIG. 3 or 21, 22 and 23 of FIG. 4) are omitted,
3. additional rovings are included between the rovings extending from the hub around the spokes,
4. the number of fibre layers varies at different positions in the article so that, for example, the hub may have a greater thickness of fibre reinforced material than the spokes,
5. instead of ending the additional rovings around the apertures as shown in FIG. 3 (16, 17 and 18) and FIG. 4 (21, 22 and 23), these rovings are continued and are brought together with a roving extending from the hub around the spokes (13, 14 and 15 or 24, 25 and 26) to form a roving which is two layers thick.

Preferably the fibre rovings are tensioned before being bonded in the matrix material. This tension may be applied during the winding sequence using rollers or bars to hold the rovings in position e.g. against the core section. Alternatively, the mould itself may be adapted to push the fibre rovings between the spokes towards the centre of the article thereby tensioning the fibre rovings passing around the spokes.

Having laid out the fibres in the mould, the mould is closed and the curable matrix material injected into the mould. The injection point or points should be selected such that the matrix material may flow through the mould leaving a minimum of voids and without substantially disturbing the arrangement of the layers of fibrous material.

Preferably the matrix material is injected from the centre of the article. As mentioned above there may be holes in the metal tube section in the core through which the matrix material may be injected into the mould. The number, size and position of the holes are selected to give an even distribution of the matrix material. For the three lobed article shown in the figures the preferred positions for the holes are in the flat of the hexagon. FIGS. 1 and 2 show an arrangement with a line of holes 12 along the centre of each flat. Preferably there are a large number of small holes arranged around the tube section 9 rather than a smaller number of large holes.

The matrix material is injected along the centre of the tube section 9 and out through the holes 12 until the mould is full. The matrix material is then cured and the article removed from the mould.

I claim:

1. A method for the production by resin injection moulding of articles from fibrous material bonded in a curable matrix material which articles comprise two or more spokes extending from a hub portion, each spoke being in the form of a loop, comprising: arranging the fibrous material in a mold so that at least as many rovings of the fibrous material as there are spokes extend in continuous paths from the hub portion around each of the spokes, each of the rovings being overlaid for at least part of its length by each of the other rovings and injection molding curable material about said fibrous material and curing said curable material.

2. A spider comprising a hub portion and two or more spokes extending from the hub portion produced according to the method of claim 1.

3. A method as claimed in claim 1 in which the rovings extending from the hub portion around the spokes are wound in one direction around the position of the hub portion and then in the opposite direction around the spokes.

4. A method as claimed in claim 1 in which the rovings extending from the hub portion around the spokes are wound in the same direction around the position of the hub portion and around the spokes.

5. A method as claimed in any one of claims 1 to 3 in which the ends of the rovings at the hub portion are equally spaced around the hub portion.

6. A method as claimed in claim 1 in which additional rovings or the fibrous material are arranged around the inner surface of the loops of the spokes.

7. A method as claimed in claim 1 in which additional rovings of the fibrous material are arranged around the hub portion.

8. A method as claimed in claim 1 in which the article has three spokes.

9. A method as claimed in claim 8 in which there are three rovings extending from the hub portion around the spokes.

10. A method as claimed in claim 1 including bonding a core section within the hub portion.

11. A method as claimed in claim 10 in which the core section comprises a tube section having a flange at each end.

12. A method as claimed in claim 10 in which the core section is made of metal, plastic or fibre reinforced plastic.

* * * * *